United States Patent
McKirchy

(10) Patent No.: US 8,745,493 B2
(45) Date of Patent: *Jun. 3, 2014

(54) METHOD AND APPARATUS FOR PROVIDING INSTRUCTIONAL HELP, AT MULTIPLE LEVELS OF SOPHISTICATION, IN A LEARNING APPLICATION

(76) Inventor: Karen A. McKirchy, Bettendorf, IA (US)

( * ) Notice: Subject to any disclaimer, the term of this patent is extended or adjusted under 35 U.S.C. 154(b) by 258 days.

This patent is subject to a terminal disclaimer.

(21) Appl. No.: 10/075,730

(22) Filed: Feb. 14, 2002

(65) Prior Publication Data

US 2002/0154155 A1    Oct. 24, 2002

Related U.S. Application Data

(63) Continuation of application No. 09/301,261, filed on Apr. 28, 1999, now abandoned, and a continuation of application No. 08/740,256, filed on Oct. 25, 1996.

(51) Int. Cl.
G06F 3/00 (2006.01)

(52) U.S. Cl.
USPC ........... 715/705; 715/707; 715/708; 715/709

(58) Field of Classification Search
CPC ....................................................... G06F 3/00
USPC ......... 715/705–708, 709, 713, 714, 715, 727, 715/728, 810, 811, 978; 434/350
See application file for complete search history.

(56) References Cited

U.S. PATENT DOCUMENTS

| | | | |
|---|---|---|---|
| 4,305,131 A | 12/1981 | Best | |
| 4,622,013 A | 11/1986 | Cerchio | |
| 4,964,077 A * | 10/1990 | Eisen et al. | 715/707 |
| 5,018,082 A | 5/1991 | Obata et al. | |
| 5,103,498 A | 4/1992 | Lanier et al. | |
| 5,226,117 A * | 7/1993 | Miklos | 715/853 |
| 5,231,571 A | 7/1993 | D'Agostino | |
| 5,257,185 A * | 10/1993 | Farley et al. | 1/1 |
| 5,267,865 A | 12/1993 | Lee et al. | |
| 5,282,255 A | 1/1994 | Bovik et al. | |
| 5,287,448 A * | 2/1994 | Nicol et al. | 715/707 |
| 5,305,206 A | 4/1994 | Inoue et al. | |
| 5,361,361 A * | 11/1994 | Hickman et al. | 715/705 |
| 5,377,319 A * | 12/1994 | Kitahara et al. | 715/707 |
| 5,395,243 A | 3/1995 | Lubin et al. | |
| 5,458,707 A | 10/1995 | Delagey et al. | |

(Continued)

OTHER PUBLICATIONS

Goldfayl, David, "Affective and Cognitive Domain Learning with Multimedia: Two Sides of the Same Coin", 8 pages, [retrieved from the Internet Mar. 1998].

(Continued)

*Primary Examiner* — Tadeese Hailu

(74) *Attorney, Agent, or Firm* — McKee, Voorhees & Sease, P.L.C.

(57) ABSTRACT

An apparatus and method for providing instructional help, at multiple levels of sophistication, in a learning application includes assistance in the form to at least two optional levels of sophistication. The user can select any level of sophistication according to desire or need. The levels allow for flexibility in learning relative to the person involved, the amount of previous knowledge the person has about the subject matter, the differences in how different people learn. In one embodiment, the assistance is contained in programming on a CD-ROM which is used in an interactive computerized system.

37 Claims, 5 Drawing Sheets

(56) References Cited

U.S. PATENT DOCUMENTS

| | | | |
|---|---|---|---|
| 5,481,667 A * | 1/1996 | Bieniek et al. | 715/709 |
| 5,493,698 A * | 2/1996 | Suzuki et al. | 370/280 |
| 5,513,308 A * | 4/1996 | Mori | 715/707 |
| 5,517,405 A * | 5/1996 | McAndrew et al. | 706/45 |
| 5,535,321 A * | 7/1996 | Massaro et al. | 715/707 |
| 5,540,589 A | 7/1996 | Waters | |
| 5,556,283 A | 9/1996 | Stendardo et al. | |
| 5,562,453 A | 10/1996 | Wen | |
| 5,565,316 A | 10/1996 | Kershaw et al. | |
| 5,581,684 A * | 12/1996 | Dudzik et al. | 715/708 |
| 5,586,218 A | 12/1996 | Allen | |
| 5,597,312 A | 1/1997 | Bloom et al. | |
| 5,613,150 A | 3/1997 | Yamada | |
| 5,657,462 A | 8/1997 | Brouwer et al. | |
| 5,682,469 A * | 10/1997 | Linnett et al. | 345/473 |
| 5,692,186 A * | 11/1997 | Fukuoka et al. | 1/1 |
| 5,727,950 A * | 3/1998 | Cook et al. | 434/350 |
| 5,729,659 A | 3/1998 | Potter | |
| 5,743,743 A * | 4/1998 | Ho et al. | 434/236 |
| 5,743,746 A * | 4/1998 | Ho et al. | 434/332 |
| 5,749,736 A * | 5/1998 | Griswold et al. | 434/322 |
| 5,774,118 A * | 6/1998 | Hatakama | 715/707 |
| 5,779,486 A * | 7/1998 | Ho et al. | 434/353 |
| 5,788,504 A * | 8/1998 | Rice et al. | 434/219 |
| 5,802,526 A * | 9/1998 | Fawcett et al. | 379/88.13 |
| 5,810,598 A * | 9/1998 | Wakamoto | 434/156 |
| 5,820,386 A * | 10/1998 | Sheppard, II | 434/322 |
| 5,827,066 A * | 10/1998 | Henter | 434/188 |
| 5,836,771 A * | 11/1998 | Ho et al. | 434/362 |
| 5,842,193 A * | 11/1998 | Reilly | 706/45 |
| 5,863,208 A * | 1/1999 | Ho et al. | 434/362 |
| 5,870,731 A * | 2/1999 | Trif et al. | 706/52 |
| 6,039,575 A * | 3/2000 | L'Allier et al. | 434/323 |
| 6,065,076 A | 5/2000 | Sorenson | |
| 6,115,690 A * | 9/2000 | Wong | 705/7.27 |
| 6,186,794 B1 * | 2/2001 | Brown et al. | 434/116 |
| 6,199,061 B1 * | 3/2001 | Blewett et al. | 707/3 |
| 6,285,993 B1 * | 9/2001 | Ferrell | 706/45 |
| 6,339,436 B1 * | 1/2002 | Amro et al. | 715/708 |
| 6,482,012 B1 * | 11/2002 | Nocera et al. | 434/236 |
| 6,577,324 B1 * | 6/2003 | Palmer et al. | 715/705 |
| 2001/0017632 A1 | 8/2001 | Goren-Bar | |
| 2001/0041330 A1 * | 11/2001 | Brown et al. | 434/332 |

OTHER PUBLICATIONS

IP.com, "PriorArtDatabase Technical Disclosure", IBM Technical Disclosure Bulletin, vol. 37, No. 3, Mar. 1994, pp. 307-308, IP.com No. IPCOM000111656D.

* cited by examiner

METHOD AND APPARATUS FOR PROVIDING INSTRUCTIONAL HELP, AT MULTIPLE LEVELS OF SOPHISTICATION, IN A LEARNING APPLICATION

CROSS-REFERENCE TO RELATED APPLICATIONS

This application is a continuation of U.S. Ser. No. 09/301,261 filed Apr. 28, 1999, now abandoned, which is a continuation of Ser. No. 08/740,256 filed Oct. 25, 1996, now abandoned, which applications are hereby incorporated by reference in their entirety.

BACKGROUND OF THE INVENTION

A. Field of the Invention

The present invention relates to learning assistance, and in particular, to help modules or methods, principally with respect to use with a learning application, such as for example, computer programming having as its function the teaching of information to users.

B. Problems in the Art

The "help" screen is widely known in the computer arts. In applications programming, it is common to have available to the program user access to explanations or technical assistance through such help screens.

Help screens are essentially ubiquitous and are therefore well known in the art and will not be discussed in detail here, except to note that conventional help screens consist of textual information that can be read by the user. Hopefully the textual information will assist or "help" the user in some fashion.

There is also known in the art help modules or what otherwise might be called training lessons. The user can essentially learn how to use the application software associated with the help module, without actually running the application software. Essentially, the help module simulates the actual programming to assist a user to become able to use the software for real applications.

There have also been attempts made in the art to provide graphics or audio enhancements to help screens or similar attempts at providing assistance to users.

All of these "help" systems are, at least in a sense, the analog to what has existed for innumerable years in books. It is common for references or authorities to be cited in the book to alert the reader to more information about a subject. The other reference can then be obtained and reviewed to supplement or assist in learning about the subject. Computerization of the learning process is convenient and economical, but present attempts to provide such learning assistance still follow the old paradigm of referencing one other way to describe the same concepts that are in the original information.

However, each of the above-mentioned methods or systems is based on merely providing supplementary information to the user. It may be supplementary in the form of text, graphics, audio, video, or any combination of the above. It should be noted however that all of the methods or systems being discussed do function as adjuncts or supplementations to the foundational information being evaluated (being learned), and that this supplementation is one-dimensional, in the sense that it restates or summarizes the foundational information, or a part thereof, in one manner, format, level of comprehension, etc.

Some existing systems use help modules which provide a reworded paraphrase or summary of the foundational information in a computer based training program. This is dissimilar in that it only spits back a question in a slightly different format to the student. It does not give in-depth information and it is not combined with other dimensions, the two or more levels of sophistication.

The phrase "level(s) of sophistication" is used herein to mean that the content of the information (audio or video, graphic or textual, etc.) varies in some sense from the other information, For example, it could vary by a person's perceptions (visual or auditory), by content, by complexity, or some other perceivable basis. Another example would be differences as subtle as the character or presentation of the information. Examples of characteristics or attributes that can be varied to provide the different levels of sophistication are set forth later in more detail. However, as used herein, level(s) of sophistication does not always mean that one level is more advanced relative to the educational or developmental status of a person. Rather, level of sophistication also means a difference, sometimes even minor, in presentation of information.

It has been found, however, that there is a need in the art for improvement to conventional learning assistance techniques. The following concepts are submitted to be accurate and demonstrable:
1. Different people learn at different rates.
2. Different people also learn in different ways.
3. Different people react to different learning techniques differently.
4. Different people learn better and quicker when provided with assistance at different levels of comprehension or at a developmentally appropriate level.
5. The same person may learn better and quicker by being provided with assistance at different levels of comprehension.

In essence, what "works" for one person may not "work" for another person, when learning. The above can be illustrated with a few examples. If a complex set of rules or regulations had to be followed in one's job, it is many times difficult to learn such rules or regulations efficiently and accurately by simply rote learning. The human language is imprecise. For any person, even very sophisticated, high comprehension persons, merely reading the bare rules or regulations may not provide complete or clear enough information to truly know and understand them. There is many times the need for context, the need to know policy behind the words, and the need to understand the architecture, so to speak, of the rules and regulations as a whole, to achieve a full understanding.

Therefore, assistance in learning such rules and regulations may come from editorial comments associated therewith, from textual summaries or explanations, or other help medium. For the uninitiated, even assistance in the form just described may not be sufficient, or learning will be slow.

Also, learning can be enhanced for some people if a more elementary explanation of information is given. It helps with context, interconnection with other concepts, and remembering certain aspects or points associated with the information being learned.

Others learn better by having more detailed or higher level help or assistance relative to the information being learned. Still further, if one is already initiated in the subject matter, or is merely trying to become refreshed regarding the same, a higher level assistance is all that may be needed. Less elementary help would actually slow down the learning process.

Thus, different persons may ultimately arrive at the same point in learning information or concepts related to a subject matter by using different assistance techniques. Also, the same person may learn and retain quicker by having different levels of assistance available.

A meritorious goal of increasing the quality and quickness of learning is the benefits that flow from the same. In almost any environment, if learning of information, rules, regulations, tasks, etc. can be minimized, savings in worker time and resources can be realized. Further, if the quality of learning is high, work quality, and a reduction of correcting mistakes, is realized. Although in some ways subtle, these benefits are important for most businesses or organizations.

Still further, any learning task can generally be made more interesting by providing flexibility and variety. The quality of learning, i.e. true understanding of the subject matter and goal, retention, etc., can be enhanced by providing learning assistance which is not merely a textual explanation or summary of the subject matter being learned. It has been shown that retention of information by humans can be materially enhanced if more than just reading of the information is done, e.g. that reading and hearing information leads to higher retention, or quality of learning.

An example of a specific problem which the present invention addresses is: How to communicate vast amounts of legal, contractual, regulatory and procedural information to large numbers of government and private sector employees in an efficient, economical and effective way in order to change behavior and improve employee work output.

The specific problem addressed by the present invention (sometimes hereafter referred to as the "Help System") is to provide an effective organizing tool to help the learner make sense out of the information overload most workers are confronted with today.

The invention is subtle and more intuitive than normal help techniques that rely on a search mechanism only and require the user to be able to articulate what he or she needs to know. This Help System gives it to them right at the topic in question and gives it to them at multiple levels.

The invention functions as a distiller and an amplifier of the information presented in the instruction which forms the backbone of the learning experience whether done in print, audio, video or in electronic interactive media.

As such, it is a completely customized, in context Help System presented in the Socratic approach. The Socratic approach has been shown to be one of the most effective ways of learning. In addition, the Help System gives the learner complete control over the level of information the learner requires for each topic. Learner control has been shown to be a very important component of effective learning systems.

Because of the speed with which a computer based system can manipulate the data, the learner is capable of seeing inter-relationships between concepts, facts, procedures, theories, and practical applications more quickly than with traditional audio, video, and text based non-electronic methods. A learner can go as slowly or as quickly, as deeply or as broadly through the material as he or she requires. The Help System contributes in a very real and important way to fulfilling this learner requirement.

Because the Help System is situated in an Information Model (see for example FIG. 2), vast amounts of information can be translated into learning much faster than ever before. The time normally spent in more customized instructional design approaches can be dramatically cut. The specific problem solved in this regard is the fact that large amounts of training need to be converted to electronic interactive learning formats. This Help System, as a part of the Information Model provides a way to organize and accomplish that very quickly.

Because of the dimensions provided by the Help System, more areas of the brain are touched. Cognitive science tells us that both the right and left brains must be considered. The different aspects of the brain and the various learning styles are addressed by the dimensions of the Help System.

This problem has not been solved completely either in traditional platform instruction, print/textbook, video or audio based training on tapes or cassettes or in other electronic interactive learning.

Platform instructors attempt to solve the problem by gearing the instruction to a certain learning level that they assume the student is in his/her understanding and mastery of the material. This assumption can retard the advanced people or overly tax the slower people. In addition, most of us are masters of some things but lost in other things so assumptions of where a class is on a topic-by-topic basis is difficult. Therefore, most platform instructors can have a lot of difficulty in addressing individual student needs. So for many students the problem has not been solved.

Print/textbooks, video and audio based instruction has all the same problems as platform instruction without the ability to respond in real time to student needs as the human instructor can do. Textbooks have the limitations of much slower information search and retrieval, cross indexing, and easily accessible multiple layered views of the subject matter. For video and audio tapes, the information is presented in linear format and the only way to get to something else is to use the inaccurate fast forward or rewind.

No other electronic interactive learning system presents information and facilitates learning in the immersive and multi-dimensional way the Information Model and its associated Help System do.

The disadvantages of other approaches are outlined below. In the current application of the invention, the Information Model lacks effectiveness without the Help System. The information normally lacks interest, personalization, and fails to provoke the curiosity inherent in all good students. The Help System remedies that.

It is therefore a principle object of the present invention to provide an apparatus and method for providing instructional help, at multiple levels of sophistication, in a learning application which improves over and solves deficiencies in the art.

Another object of the present invention is to provide an apparatus and method as above described which assists a person in evaluating and understanding information relating to a subject with more than simply supplementary text.

Further objects, features and advantages of the present invention include providing an apparatus and method as above-described which:

1. assists in learning for different types, aptitudes, and skills of different persons;
2. is flexible in its application to different persons, and to the skills and aptitudes of the same person
3. is flexible in presenting choices to users so that users can decide for themselves the best way to get assistance, or can decide the best type of assistance for the particular need of the moment;
4. is interesting and compelling to the user; and
5. is efficient and economical.

The Help System addresses a variety of learning styles more effectively because it is totally under the control of the learner.

The Help System is very context sensitive system. It allows the learner to step around all aspects of a given topic as well as all aspects of a given subject.

The Help System is more interesting. It simulates being in a discussion of experts who represent different takes on the same information. Particularly effective is the emphasis on the practical application and the bottom line aspects delivered by the "Huh?" attribute.

From the instructional designer's point of view, the Help System, as part of the Information Model, gives the designer the ability:

i) to deliver an immersive learning experience.
ii) to process complex, lengthy, sometimes boring information, in a organized, bite-sized, and interesting fashion.
iii) to deploy courses more quickly than any other method.

These and other objects, features, and advantages will become more apparent with reference to the accompanying specification and claims.

SUMMARY OF THE INVENTION

The present invention includes a method of assisting learning or evaluation of information related to a subject. The method provides learning assistance to a user, where the learning assistance is directed to the same subject matter, but is on multiple levels of sophistication. The user therefore has, at selected times or for selected information, at least two help options directed to the same information that the user is attempting to learn. The assistance can be presented in audio or visual form, or both. The levels can be distinguishable from one another based on such things as type of voice, level of comprehension of words, personality characteristics associated with a voice or words, graphics, as well as others.

The apparatus according to the present invention includes information relating to the subject contained in some user perceivable form. Learning assistance relative to the information is contained in a user perceivable form at least two levels of sophistication. The user perceivable form may be digital data on a memory storage medium for a computer, and can be in audio, visual, or combined form. Other environments are possible, such as web or network environments, books, audio or video tapes, laser discs, and other environments where information is presented and help or assistance can be useful in understanding, implementing, or evaluating the information.

DETAILED DESCRIPTION OF THE PREFERRED EMBODIMENT

A. Overview

Figure 1:
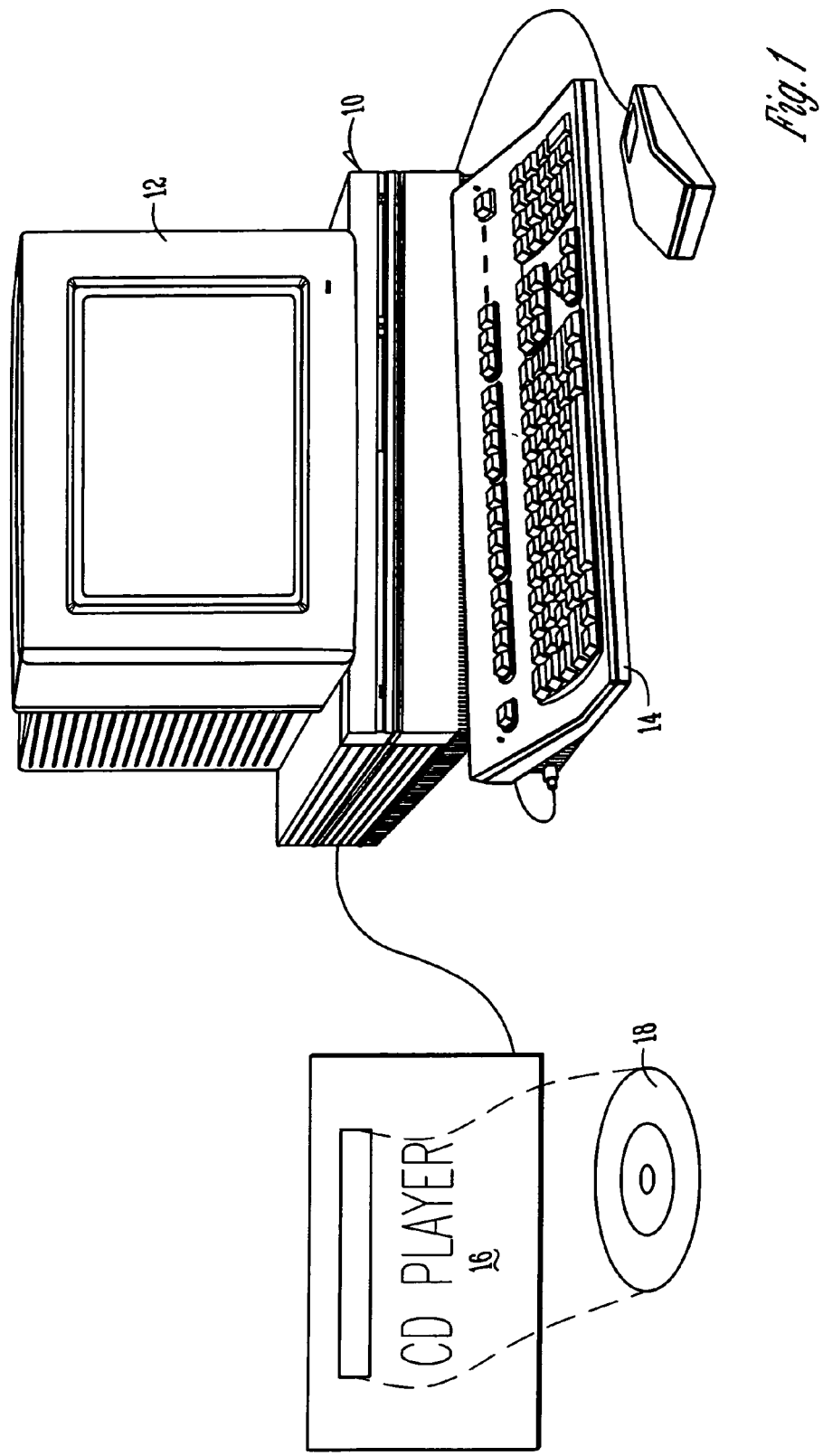
FIG. 1 is a diagrammatic depiction of a personal computer system with a CD player that can be used with the preferred embodiment of the present invention.

To assist in a better understanding of the present invention, one form the invention could take will now be described in detail. Reference will sometimes be taken to the drawings, which were summarized immediately above. Reference numerals or letters are used to indicate certain parts or locations in the drawings. The same reference numerals or letters will be used to indicate the same parts and locations throughout the drawings unless otherwise indicated.

In the description of this preferred embodiment, the environment and context of the learning application will be with respect to a computer-based, interactive software program to teach individuals the rules and regulations about using what is called a purchase card. This purchase card is essentially a credit card or debit card. Authorized personnel for a company or organization can use the card to make acquisitions on behalf of the company or organization, but certain procedures must be followed. Such cards have been used in businesses and are being used in such organizations as certain agencies of the government.

Such cards usually have restrictions as to when they can be used, who can use them, etc. Therefore, there is a considerable amount of essentially rules and regulations that must be mastered to correctly use the cards. Incorrect use can result in significant problems, and therefore good training is a necessity.

However, good training also needs to be efficient training in terms of time on behalf of authorized personnel that will use the cards. Therefore, in the preferred embodiment, training in use of the purchase card will be accomplished using an interactive computerized learning station.

FIG. 1 depicts such a learning station. A personal computer (PC) 10 includes a monitor 12 and a keyboard 14. A CD-ROM drive/player 16 is operatively connected to computer 10, such as is well known in the art.

Training is facilitated by a user placing a CD-ROM 18 into drive 16, and operating computer 10 to install and run the programming on CD 18.

CD 18 has audio-visual content and helps the user learn about the purchase card and its rules and regulations.

Following is further description of a system according to the present invention.

Figure 2:
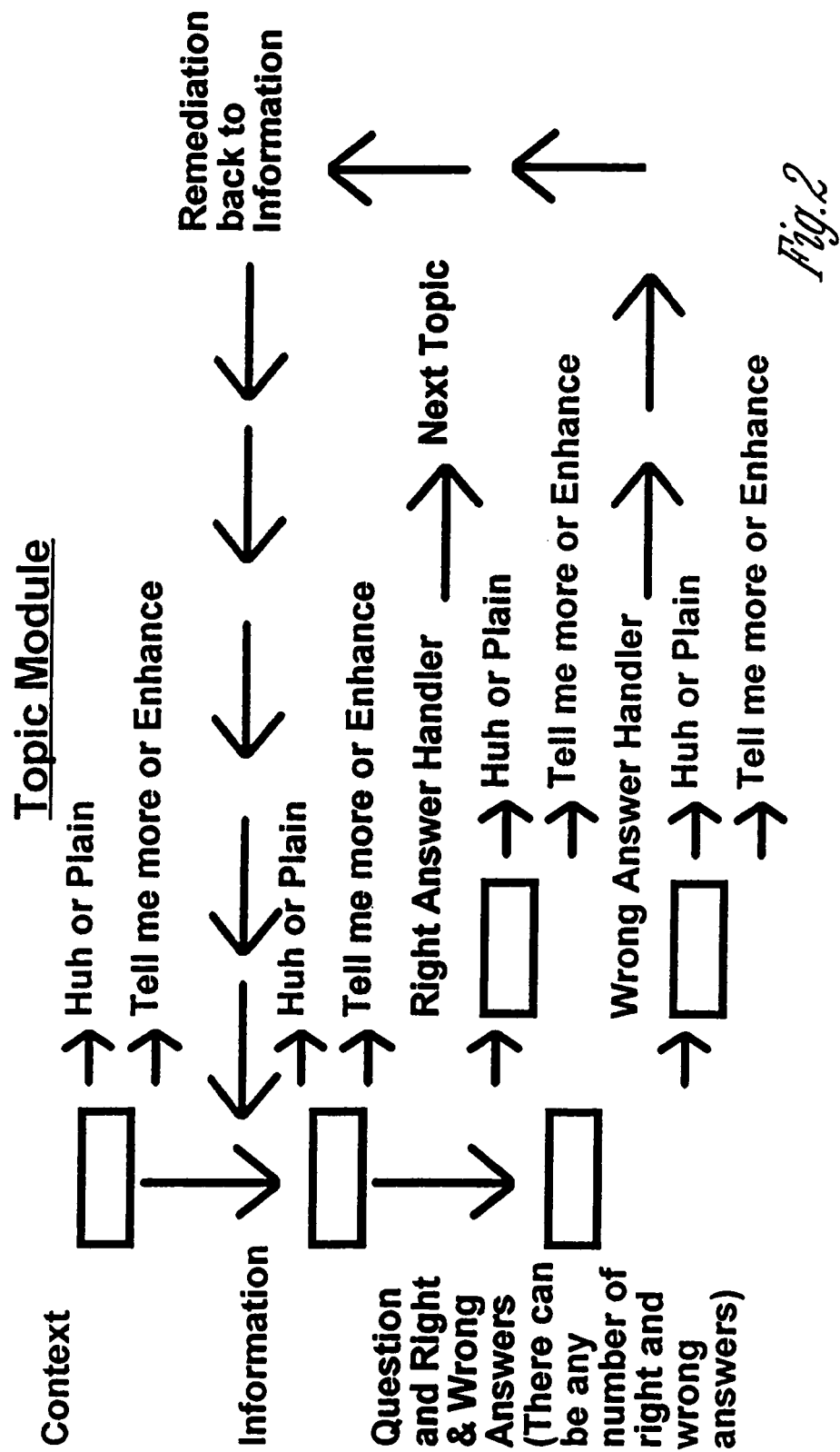
FIG. 2 is a flowchart diagram of a two-level of sophistication help module according to a preferred embodiment of the invention.

A multimedia instructional application is often developed from an information model. This information model is a graphical representation of how, and at what stage, instructional text and graphics will be presented to the user. FIG. 2 shows a specific information model that has been found to be particularly effective. Here, the "Huh" and "Tell me more" levels of sophistication are shown juxtaposed at various stages of the application. As illustrated in the drawing, after information on a particular topic is presented, then the program asks the user a series of questions on the topic. After the user answers correctly, then the program advances to the next topic. The user can access the "Huh" or "Tell me more" help at various stages: (1) at the beginning of the program, when the context of the application is explained, (2) when the user is presented with instructional text (information), (3) in response to a question presented by the program, and (4) after selecting a right or wrong answer to a question.

In a preferred embodiment of the invention, the two-levels of sophistication are incorporated into a multimedia computer software application. Multimedia in the computer context generally refers to the selection and arrangement of text, graphics, and sound that appeals to and stimulates the human senses. A multimedia software applications for use with an operating system that employs a graphical user interface (GUI) is preferred. Examples of GUIs commonly used in the industry include Windows 95, Windows NT and the Apple Macintosh user interface, and the up-coming wide-spread use of web browsers.

There exists a myriad of different multimedia software development tools suitable for creating and maintaining a help or tutorial program employing two-level sophisticated help. Asymmetric Toolbook® is a particularly valuable and facile development tool. Asymmetric Toolbook® and other similar development tools speed development time by providing a "work bench" that allows the developer to create and arrange the windows, dialog boxes, text, graphics, audio clips, etc., as desired without having to resort to the task of writing time-consuming and cumbersome code in computer languages such as Visual Basic and C++. As an example, the developer can insert a data field or list box, all common objects used in a GUI environment, by choosing the appropriate object and then drawing that object in the desired location using a mouse or other drawing aid. Once the object is fixed on the screen, the development tool provides the logic that enables the object to function in the graphical environment.

Figure 3:
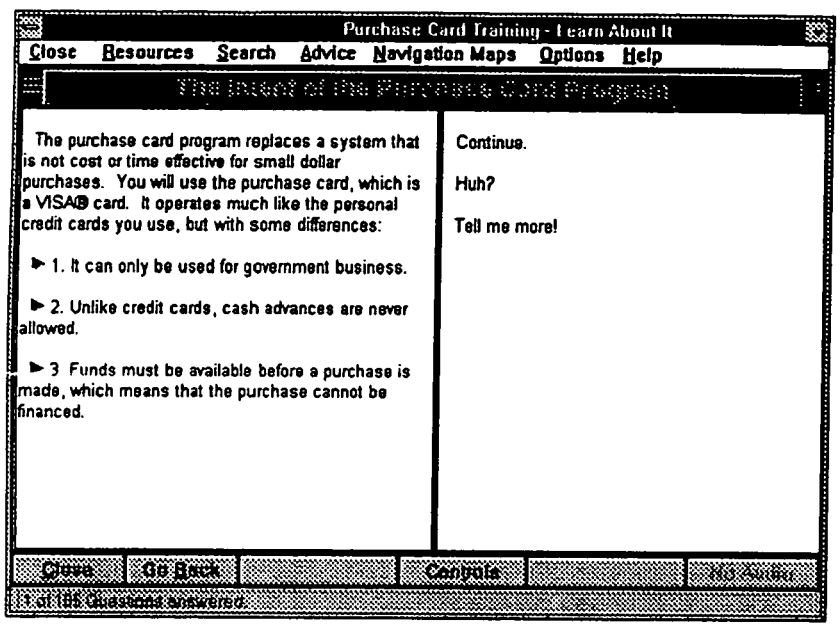
FIG. 3 is a screen display of information relating to a subject (left side of the screen) and two different help options (right side of screen under "continue").
Figure 4:
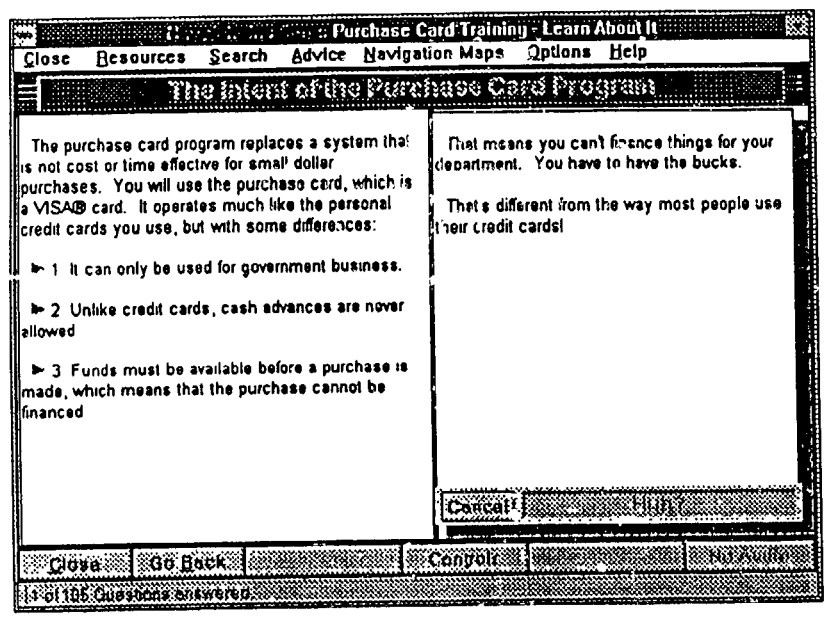
FIG. 4 is a screen display of the information of FIG. 3 (still on the left side) with a first set of help information relating to the information (right side).
Figure 5:
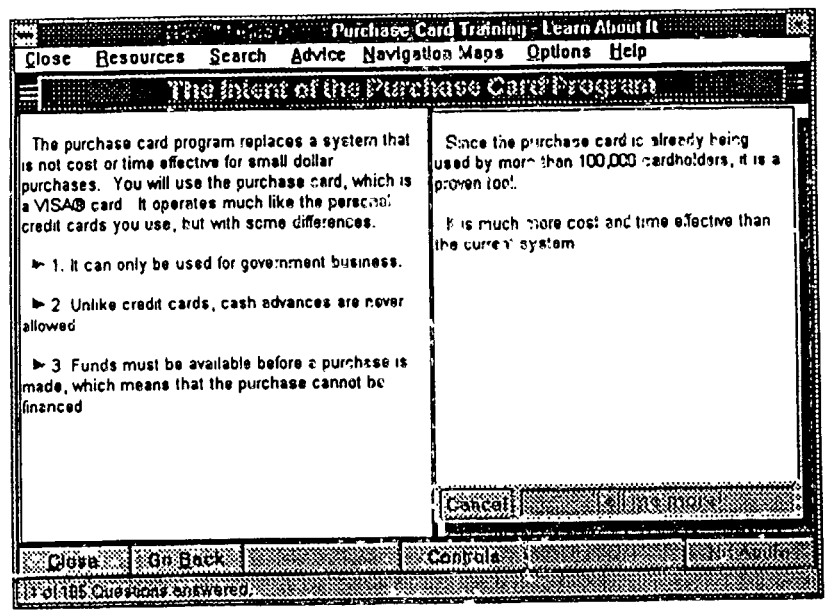
FIG. 5 is a screen display of the information of FIG. 3 (still on the left side) with a second set of help information relating to the information (right side).

Multimedia applications often contain multiple screens or windows of text, data, and graphics. These screens or windows are sometimes referred to as pages, with the entire help or tutorial application constituting a book. Links are created between different pages of the book to give the application much of its flow and functionality. An illustration is best shown in FIGS. 3-5. If in response to the information presented in FIG. 3 the user selects (clicks on) the appropriate button or selection, for example "Huh" (using a peripheral mouse or other input device), then the "Huh" explanation as shown in FIG. 4 appears along with the accompanying voice. The development tool allows the user to specify the text, picture, button, etc. to serve as the link, as well as the areas which are being linked.

In the preferred embodiment, when "Huh?" is selected, the text shown in FIG. 4 appears on the right side of the screen while an older man, in a rough, gravelly or husky voice, vocalizes those words. The voice is a caricature; like a wise but gruff grandfather, or world-wise, cut-to-the-chase person. When "Tell Me More" is selected, not only do the words on the right side of FIG. 5 appear, but a women in a calm, direct, authoritative, but patient and assuring voice, vocalizes those words. The voice is a caricature; like a respected, instructive professor.

It is to be understood that the use of the identifiers "Huh?" and "Tell Me More" are arbitrary. Other identifiers can be used.

If in response to the information presented in FIG. 3 the user selects "Tell Me More" (using a peripheral mouse or other input device), then the "Tell Me More" explanation as shown in FIG. 5 appears along with the accompanying voice. The development tool allows the user to specify the text, picture, button, etc. to serve as the link, as well as the areas which are being linked.

Because more sophisticated logic is often required to control or enhance an application, Toolbook® is designed for use with a particular scripting language. A scripting language is a high level programming language that gives the developer more control over the functionality of the application. One skilled in the art can quickly and easily write short routines to enhance the application.

During the testing and development stage, the source file is edited that runs under Toolbook®. However, once the application has been modified and debugged into its preferred form, the source file is compiled into an executable file that can run independently of Toolbook®. This executable file, as well as other data and install files, can then be digitally fixed on a CD ROM or other data storage device and provided to the end user for installation on a particular platform.

As shown in FIG. 1, the multimedia application is intended for use on a IBM-compatible personal computer having at least 8 megabytes of RAM, twenty megabytes of free hard disk space, and a quad-speed CD-ROM. Multimedia applications using two-levels of sophisticated instruction or help can also be developed for other platforms, such as Apple Macintosh operating system or UNIX, as well as web or internet type environments.

It is to be understood that the above description of the preferred embodiment is not intended to and does not limit the scope of the present invention. Variations obvious to those of ordinary skill in the art are included herein. The claims define the scope of the invention.

For example, in the preferred embodiment, the two levels of sophistication are defined by (a) the type of voice and (b) the type of language. Other types of differentiation can be used to provide the two levels of sophistication.

Moreover, the preferred embodiment is described relative to an interactive, CD-ROM based program on a computer. The concept of two levels of sophistication can apply to other learning environments, books, audio, video, and web.

Additionally, below are examples of a variety of different ways in which different levels of sophistication, according to the meaning ascribed herein, can be applied to the invention:

Audio Options
    Audio—Voice
    Audio—Sounds
    Audio—Music
    Audio—Voice with Music or other Relevant Sounds
    Audio—with Symbolic or Illustrative Graphics and Text
    Audio—with Text in Lay Terms
    Audio—with Text in Technical Terms
    Audio—with Text in Functional Terms
    Audio—with Text in Procedural Terms
    Audio—with Background Information
    Audio—with any of the Graphic, Text and/or Video options itemized below Graphic Options
    Graphic Representation—Character (s)
    Graphic Representation—Character (s) with Voice
    Graphic Representation—Animated Character (s) with Voice
    Graphic Representation—Animated Character (s) with Voice or other Relevant Sounds
    Graphic Representation—Video with Graphic Overlay
    Graphic Representation—Video and Audio with Graphic Overlay
    Graphic—with any of the Text, Audio and/or Video Options itemized above and below Text Options
    Text—Distilled Text to Simplify Information
    Text—Amplified Text to Background Information
    Text—Basic and "Must Have Information"
    Text—Advanced "Nice to Have Information"
    Text—Master Level Information
    Text—Gray Area (s) and Judgment Call (s) Information
    Text—with Graphics, Symbols and Visual Organizers
    Text—with Embedded Graphics
    Text—with Stage-Based Graphics
    Text—with Embedded Animation
    Text—with Stage-Based Animation
    Text—Worksheets/Spreadsheets with Audio
    Text—Reference Documents with Audio
    Text—Process and Flowcharts with Audio
    Text—How To Information with Audio
    Text—Humor
    Text—Warning Oriented Text—Functional Presentation
Text—Procedural Presentation
Text—Lay Terms Based Presentation
Text—Technical Terms Based Presentation
Text—Functional Terms Based Presentation
Text—Procedural Terms Based Presentation
Text—with Graphic to Provide Framework for Information
Text—Linked to other text to provide a pre-defined path through the subject that is delivered from a consistent and defined view
Text—Stand alone, linked to other text boxes, or linked to case histories and/or examples to provide a comprehensive and sequential walk-through of a practical application, process, or procedure from a consistent and defined view
Text—with any of the Itemized Graphic, Video and/or Audio Options Video Options
Video—No Audio
Video—with Audio
Video—with Audio and text
Video—Talking Head as Character
Video—Talking Head and Animations
Video—Simulations
Video—with any of the Itemized Graphic, Text and/or Audio options above In the preferred embodiment the difference in level of sophistication is not only the words used for each "Huh?" and each "Tell Me More", but also the nature of the voice used to announce the words. Specifically, "Huh?" words are voiced by a bottom-line type of character (in this case an older man, brusque, gravelly voice, no-non-sense, get to the bottom line). In comparison, the "Tell Me More" words are voiced by a professorial type of character (in this case a woman, professional, calm, sophisticated, authoritative, provide context and substance). Additionally, the invention contemplates that more than two levels of sophistication can be used. For example, there can be customizable characters, dependent characters, and independent characters.

It is to be understood that the "character" used with a "level of sophistication" can provide subtle benefits to the assistance given to the user. The user can almost subconsciously identify a level of sophistication to the character, which almost subconsciously assists the user in the learning process.

It is to be understood also that the invention can be tailored to the individualized needs of a company or organization, or of particular persons or to particular subject matter.

There can also be what can be called "zoom capability", for example, "tell me mores" inside "tell me mores", etc.

There could also be what will be called a "customized teacher", where one picks whose voice is wanted as the main line voice and then can listen to that view as the main view. Voices could appear on the right side of the screen. In other words, if one wanted a "bottom line" to be taught, one could just call in the lecturer when wanted, pertaining to that view. This would call for screen reconfiguration on the fly.

Also, the Help System according to the invention could be associated with things other than information to be learned by reading and/or listening to textual material. It could also be used with tests. The user could answer a test question and have available multiple levels of sophistication of explanation about the question, the right answer, the wrong answer, etc.

In certain situations, the multiple level of sophistication Help System can be implemented where some of the time only one help option is available, but at other times multiple levels are available. This would be another way to mix and vary the help options to keep the interest of the user.

Non-computerized applications are possible. For example in book form training materials, multiple levels of sophistication help could be placed at one side of the page next to the information being learned, or could be placed at other portions of the book, or in other books or booklets that are cross-referenced to the main book.

Also, the invention can be used with customizable targets. For example, if a section of the information being learned involves using a purchase card, and a specific subsection of the information is directed to how to actually make a purchase, a customizable target might be the topic of how to purchase a particular product, such as for example, software. This could be done with varying levels of sophistication.

What is claimed:

1. A method of providing instruction to a user of an instructional program comprising:
presenting an interactive instructional program to the user via an information processing device, the program having a plurality of sections each comprising instructional information related to a subject to be learned and displayable to the user;
making available to the user via the information processing device additional instructional options related to the instructional information to be learned for one or more sections in the program;
the additional instructional options for said one or more sections including additional instructional information available to the user via the information processing device in at least first and second levels of sophistication, said first and second levels of sophistication being distinguishable by voice and/or characterization, any of the at least first and second levels of sophistication being user-selectable via the information processing device at any time and in any order, wherein the first level of sophistication comprises a first type of voice.

2. The method of claim 1 wherein the first level of sophistication comprises information at a first level of comprehension.

3. The method of claim 1 wherein the second level of sophistication comprises information at a second level of comprehension.

4. The method of claim 1 wherein the second level of comprehension is at a higher level than the first level of comprehension.

5. The method of claim 1 wherein the second level of sophistication comprises a second type of voice.

6. The method of claim 1 wherein the first level of sophistication has attributes comprising one or more of short, low educational, plain language, summary fashion, brusque voice, man's deep voice.

7. The method of claim 6 wherein the second level of sophistication has attributes comprising one or more of long, high educational, more complex language, detailed, relaxed voice, woman's voice.

8. The method of claim 1 where each level of sophistication has one or more attributes which differ from the other level of sophistication, the attributes comprising one or more of type of voice, type of language, type of graphics, type of background sound, and detail of information.

9. The method of claim 1 further comprising additional instructional information available to the user in a form perceivable by the user at a third level of sophistication.

10. The method of claim 1 further comprising at least two sections of the program have additional instructional options and the number of levels of sophistication varies between the at least two sections.

11. The method of claim 1 further comprising at least two sections of the program have additional instructional options and the type of additional instructional information varies between the at least two sections.

12. The method of claim 1 wherein the instructional information comprises instruction, questions, or question feedback related to the subject.

13. The method of claim 12 further comprising varying the type of instructional information between at least two sections of the program.

14. The method of claim 1 further comprising at least one section of the program having no additional instructional options.

15. The method of claim 1 further comprising at least one section of the program having an additional instructional option at one level of sophistication.

16. The method of claim 1 wherein the first or second level of sophistication has attributes comprising at least one or more of differences in textual sentence length, level of language used, type of language used, length of information presented, type of information presented, gender of voice, texture of voice, age of voice, speed of voice, personality, communication style, and characterization.

17. An apparatus for providing instruction to a user of an instructional program comprising:
 an information processing device including a digital information storage medium;
 a software program loaded on the digital storage medium; the program comprising;
  (a) interactive instructional information relating to a subject matter, the instructional information comprising a plurality of sections to be learned and displayable to the user;
  (b) an instruction module including additional instructional options related to the plurality of sections to be learned, the additional instructional options including additional instructional information available to the user via the information processing device in no less than two levels of sophistication, said first and second levels of sophistication being distinguishable by voice and/or characterization, any of the levels of sophistication being user-selectable at any time and in any order, wherein the two levels of sophistication include a first level comprising a first voice and a second level comprising a second voice.

18. The apparatus of claim 17 wherein the two levels of sophistication include a first level comprising a first textual content and a second level comprising a second textual content.

19. The apparatus of claim 17 further comprising at least two sections of the program have additional instructional options and the number of levels of sophistication varies between the at least two sections.

20. The apparatus of claim 17 further comprising at least two sections of the program have additional instructional options and the type of additional instructional information varies between the at least two sections.

21. The apparatus of claim 17 Wherein the instructional information comprises instruction, questions, or question feedback related to the subject.

22. The apparatus of claim 17 further comprising at least one section of the program having no additional instructional options.

23. The apparatus of claim 17 further comprising at least one section of the program having an additional instructional option at one level of sophistication.

24. An apparatus of claim 17 wherein the first or second level of sophistication has attributes comprising at least one or more of differences in textual sentence length, level of language used, type of language used, length of information presented, type of information presented, gender of voice, texture of voice, age of voice, speed of voice, personality, communication style, and characterization.

25. An interactive learning system comprising:
 an information processing device with a display;
 a lesson in the form of information to be learned and displayable to the user on a digital media that is viewable and perceivable by a user on the information processing device;
 learning assistance related to at least one part of the lesson information to be learned and in the form of additional information on the digital media that is viewable and perceivable by a user on the information processing device;
 the additional information available to the user via the information processing device in no less than two levels of sophistication, said first and second levels of sophistication being distinguishable by voice and/or characterization, any of the levels of sophistication being user-selectable at any time and in any order, wherein the two levels of sophistication include a first level comprising a first voice and a second level comprising a second voice.

26. The system of claim 25 wherein the two levels of sophistication include a first level comprising a first textual content and a second level comprising a second textual content.

27. The system of claim 25 further comprising at least one section of the program having no additional instructional options.

28. The system of claim 25 further comprising at least two sections of the program have additional instructional options and the type of additional instructional information varies between the at least two sections.

29. The system of claim 25 wherein the instructional information comprises instruction, questions, or question feedback related to the subject.

30. The system of claim 25 further comprising at least one section of the program having an additional instructional option at one level of sophistication.

31. The system of claim 25 further comprising at least two sections of the program having additional instructional options and the number of levels of sophistication varies between the at least two sections.

32. The system of claim 25 wherein the first or second level of sophistication has attributes comprising at least one or more of differences in textual sentence length, level of language used, type of language used, length of information presented, type of information presented, gender of voice, texture of voice, age of voice, speed of voice, personality, communication style, and characterization.

33. A method of providing instruction to a user of an instructional program comprising:
 presenting an interactive instructional program to the user via an information processing device, the program having a plurality of sections each comprising instructional information related to a subject to be learned and displayable to the user;

making available to the user via the information processing device additional instructional options related to the instructional information to be learned for one or more sections in the program;

the additional instructional options for said one or more sections including additional instructional information available to the user via the information processing device in at least first and second levels of sophistication, said first and second levels of sophistication being distinguishable by voice and/or characterization, any of the at least first and second levels of sophistication being user-selectable via the information processing device at any time and in any order, wherein the two levels of sophistication include a first level comprising a first character and a second level comprising a second character.

34. An apparatus for providing instruction to a user of an instructional program comprising:

an information processing device including a digital information storage medium;

a software program loaded on the digital storage medium; the program comprising;

(a) interactive instructional information relating to a subject matter, the instructional information comprising a plurality of sections to be learned and displayable to the user;

(b) an instruction module including additional instructional options related to the plurality of sections to be learned, the additional instructional options including additional instructional information available to the user via the information processing device in no less than two levels of sophistication, said first and second levels of sophistication being distinguishable by voice and/or characterization, any of the levels of sophistication being user-selectable at any time and in any order, wherein the two levels of sophistication include a first level comprising a first character and a second level comprising a second character.

35. An apparatus for providing instruction to a user of an instructional program comprising:

an information processing device including a digital information storage medium;

a software program loaded on the digital storage medium; the program comprising;

(a) interactive instructional information relating to a subject matter, the instructional information comprising a plurality of sections to be learned and displayable to the user;

(b) an instruction module including additional instructional options related to the plurality of sections to be learned, the additional instructional options including additional instructional information available to the user via the information processing device in no less than two levels of sophistication, said first and second levels of sophistication being distinguishable by voice and/or characterization, any of the levels of sophistication being user-selectable at any time and in any order, wherein the two levels of sophistication include a first level comprising a first voice and a first textual content and a second level comprising a second voice and a second textual content.

36. An interactive learning system comprising:

an information processing device with a display;

a lesson in the form of information to be learned and displayable to the user on a digital media that is viewable and perceivable by a user on the information processing device;

learning assistance related to at least one part of the lesson information to be learned and in the form of additional information on the digital media that is viewable and perceivable by a user on the information processing device;

the additional information available to the user via the information processing device in no less than two levels of sophistication, said first and second levels of sophistication being distinguishable by voice and/or characterization, any of the levels of sophistication being user-selectable at any time and in any order, wherein the two levels of sophistication include a first level comprising a first character and a second level comprising a second character.

37. An interactive learning system comprising:

an information processing device with a display;

a lesson in the form of information to be learned and displayable to the user on a digital media that is viewable and perceivable by a user on the information processing device;

learning assistance related to at least one part of the lesson information to be learned and in the form of additional information on the digital media that is viewable and perceivable by a user on the information processing device;

the additional information available to the user via the information processing device in no less than two levels of sophistication, said first and second levels of sophistication being distinguishable by voice and/or characterization, any of the levels of sophistication being user-selectable at any time and in any order, wherein the two levels of sophistication include a first level comprising a first voice and a first textual content and a second level comprising a second voice and a second textual content.

* * * * *